United States Patent
Tourunen et al.

(10) Patent No.: US 8,924,156 B2
(45) Date of Patent: Dec. 30, 2014

(54) METHOD, APPARATUS, COMPUTER PROGRAM AND USER INTERFACE

(75) Inventors: Ari O. Tourunen, Espoo (FI); Timo V. Kinnunen, Paavola (FI); Aqdas A. Malik, Espoo (FI); Suvi M. Peltomaki, Tampere (FI)

(73) Assignee: Nokia Corporation, Espoo (FI)

( * ) Notice: Subject to any disclaimer, the term of this patent is extended or adjusted under 35 U.S.C. 154(b) by 494 days.

(21) Appl. No.: 12/383,705

(22) Filed: Mar. 26, 2009

(65) Prior Publication Data

US 2010/0250108 A1  Sep. 30, 2010

(51) Int. Cl.
| | |
|---|---|
| *G08G 1/123* | (2006.01) |
| *G01C 21/36* | (2006.01) |
| *G01C 21/32* | (2006.01) |
| *G01C 21/26* | (2006.01) |
| *G01C 21/30* | (2006.01) |
| *H04M 1/725* | (2006.01) |
| *H04M 1/2745* | (2006.01) |

(52) U.S. Cl.
CPC ............ *G01C 21/362* (2013.01); *G01C 21/32* (2013.01); *G01C 21/26* (2013.01); *G01C 21/30* (2013.01); *H04M 1/274508* (2013.01); *H04M 1/274533* (2013.01); *H04M 1/72572* (2013.01); *H04M 2250/10* (2013.01)
USPC ........... 701/532; 701/533; 701/426; 701/411; 701/410; 701/409; 701/436; 715/810

(58) Field of Classification Search
CPC ...... G01C 21/26; G01C 21/36; G01C 21/362; G01C 21/32; G01C 21/30
USPC ........ 701/200, 213, 208, 216, 410, 426, 532; 705/26.1, 7.25, 7.34; 340/5.8, 7.56; 707/3, 999.003; 455/457; 715/733
See application file for complete search history.

(56) References Cited

U.S. PATENT DOCUMENTS

| | | | |
|---|---|---|---|
| 2003/0034879 A1* | 2/2003 | Rangarajan et al. ......... 340/7.56 |
| 2005/0091072 A1 | 4/2005 | Dunn et al. ........................ 705/1 |
| 2005/0114021 A1* | 5/2005 | Krull et al. .................... 701/211 |
| 2006/0080032 A1* | 4/2006 | Cooper et al. ................ 701/208 |
| 2006/0271287 A1* | 11/2006 | Gold et al. ................... 701/211 |
| 2007/0067098 A1 | 3/2007 | Zelentsov .................... 701/208 |

(Continued)

FOREIGN PATENT DOCUMENTS

| | | |
|---|---|---|
| CN | 101149271 A | 3/2008 |
| WO | WO-2010/109358 A1 | 9/2010 |

OTHER PUBLICATIONS

Rejection Decision of May 20, 2014 on application RU 2011142448. English translation of the Examiner's arguments set forth in the Rejection Decision.

*Primary Examiner* — Yogesh C Garg
(74) *Attorney, Agent, or Firm* — Harrington & Smith

(57) ABSTRACT

A method, apparatus, computer program and user interface wherein the method includes: obtaining coordinate information from a first application where the coordinate information uniquely identifies an address as a location in a coordinate space; storing, using a second application, the coordinate information so that the coordinate information is associated with contact information indicative of the address; detecting user selection of a control element associated with the stored contact information; and in response to the detection of the user selection of the control element providing the coordinate information to the first application.

10 Claims, 6 Drawing Sheets

(56) References Cited

U.S. PATENT DOCUMENTS

| | | | |
|---|---|---|---|
| 2008/0176545 A1* | 7/2008 | Dicke et al. | 455/418 |
| 2008/0280600 A1 | 11/2008 | Zhou | 455/415 |
| 2009/0005068 A1* | 1/2009 | Forstall et al. | 455/456.1 |
| 2009/0327501 A1* | 12/2009 | Athsani et al. | 709/229 |
| 2010/0010736 A1 | 1/2010 | Siegel | 701/208 |
| 2010/0082239 A1* | 4/2010 | Hardy et al. | 701/208 |
| 2010/0216491 A1* | 8/2010 | Winkler et al. | 455/457 |
| 2013/0346916 A1* | 12/2013 | Williamson et al. | 715/800 |

* cited by examiner

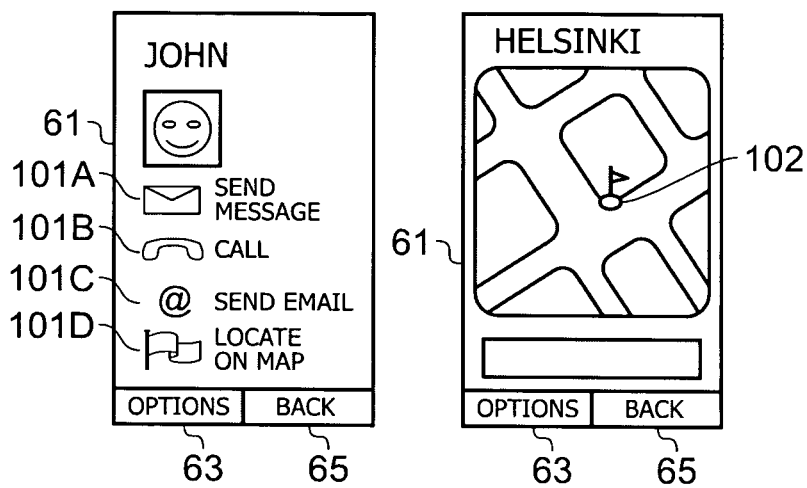

METHOD, APPARATUS, COMPUTER PROGRAM AND USER INTERFACE

FIELD OF THE INVENTION

Embodiments of the present invention relate to a method, apparatus, computer program and user interface. In particular, they relate to a method, apparatus, computer program and user interface for enabling a location in a coordinate space to be displayed.

BACKGROUND TO THE INVENTION

Apparatus that enable a user to find and view locations within a coordinate space are well known. For example apparatus such as satellite navigation systems enable a user to input an address and then view the corresponding location on a map of the coordinate space. Such apparatus may also be configured to enable a user to obtain directions between the location and other locations or to find points of interest near the location.

It is advantageous to make such apparatus easy and intuitive for the user to use.

BRIEF DESCRIPTION OF VARIOUS EMBODIMENTS OF THE INVENTION

According to various, but not necessarily all, embodiments of the invention there is provided a method comprising: obtaining coordinate information from a first application where the coordinate information uniquely identifies an address as a location in a coordinate space; storing, using a second application, the coordinate information so that the coordinate information is associated with contact information indicative of the address; detecting user selection of a control element associated with the stored contact information; and in response to the detection of the user selection of the control element providing the coordinate information to the first application.

In some embodiments of the invention the first application may use the coordinate information to enable the location to be displayed.

In some embodiments of the invention the contact information may be input by a user. In some embodiments of the invention the contact information may comprise the complete address.

In some embodiments of the invention the contact information may be provided to the first application by the second application to enable the first application to find the coordinate information.

In some embodiments of the invention the contact information may be input into the first application by the user and may be provided to the second application from the first application to enable the contact information to be stored.

In some embodiments of the invention the first application may be a map application. In some embodiments of the invention the second application may be a database application.

In some embodiments of the invention the first application may be within the same apparatus as the second application. In other embodiments of the invention the first application may be in a different apparatus to the second application.

According to various, but not necessarily all, embodiments of the invention there is provided an apparatus comprising: a display configured to display a location; a user input device configured to enable a user to select a control element; and a controller where the controller is configured to obtain coordinate information from a first application where the coordinate information uniquely identifies an address as a location in a coordinate space and the controller is also configured to use a second application to store the coordinate information so that the coordinate information is associated with contact information indicative of the address and the controller is also configured to detect actuation of the user input device to select a control element and provide, in response to the detection of the selection of the control element, the coordinate information to the first application.

In some embodiments of the invention the controller may be configured to use the coordinate information to enable the location to be displayed on the display.

In some embodiments of the invention the contact information may be input by a user. In some embodiments of the invention the contact information may comprise the complete address.

In some embodiments of the invention the first application may be a map application. In some embodiments of the invention the second application may be a database application.

In some embodiments of the invention the first application may be within the same apparatus as the second application. In some embodiments of the invention the first application may be in a different apparatus to the second application.

The apparatus may be for wireless communication or enabling navigation.

According to various, but not necessarily all, embodiments of the invention there is provided a computer program comprising computer program instructions configured to control an apparatus, the program instructions providing, when loaded into a processor: means for obtaining coordinate information from a first application where the coordinate information uniquely identifies an address as a location in a coordinate space; means for storing, using a second application, the coordinate information so that the coordinate information is associated with contact information indicative of the address; means for detecting user selection of a control element associated with the stored contact information; and means for providing, in response to the detection of the user selection of the control element, the coordinate information to the first application.

In some embodiments of the invention there is provided a physical entity embodying the computer program as described in the above paragraph.

In some embodiments of the invention there is provided an electromagnetic carrier signal carrying the computer program as described in the above paragraph.

In some embodiments of the invention there is provided a computer program comprising program instructions for causing a controller to perform the method as described above.

According to various, but not necessarily all, embodiments of the invention there is provided a user interface comprising: a display configured to display contact information indicative of an address wherein coordinate information, which uniquely identifies an address as a location in a coordinate space, is associated with the contact information; a user input device configured to enable a user to select a control element associated with the contact information; wherein the user interface is configured such that in response to the detection of the user selection of the control element the coordinate information is provided to a first application to enable the location to be displayed on the display.

In some embodiments of the invention a second application is used to store the contact information.

According to various, but not necessarily all, embodiments of the invention there is provided a method comprising: finding, using a first application, coordinate information for an address wherein the coordinate information uniquely identifies a location within a coordinate space; providing the coordinate information to a second application to enable the coordinate information to be associated with contact information stored using the second application; retrieving, in response to detection of user selection of a control element, the coordinate information from the second application; and using the retrieved coordinate information to enable the location to be displayed.

BRIEF DESCRIPTION OF THE DRAWINGS

For a better understanding of various examples of embodiments of the present invention reference will now be made by way of example only to the accompanying drawings in which:

FIGS. 4A to 4B illustrate another embodiment of the invention in use;

DETAILED DESCRIPTION OF VARIOUS EMBODIMENTS OF THE INVENTION

Figure 1:
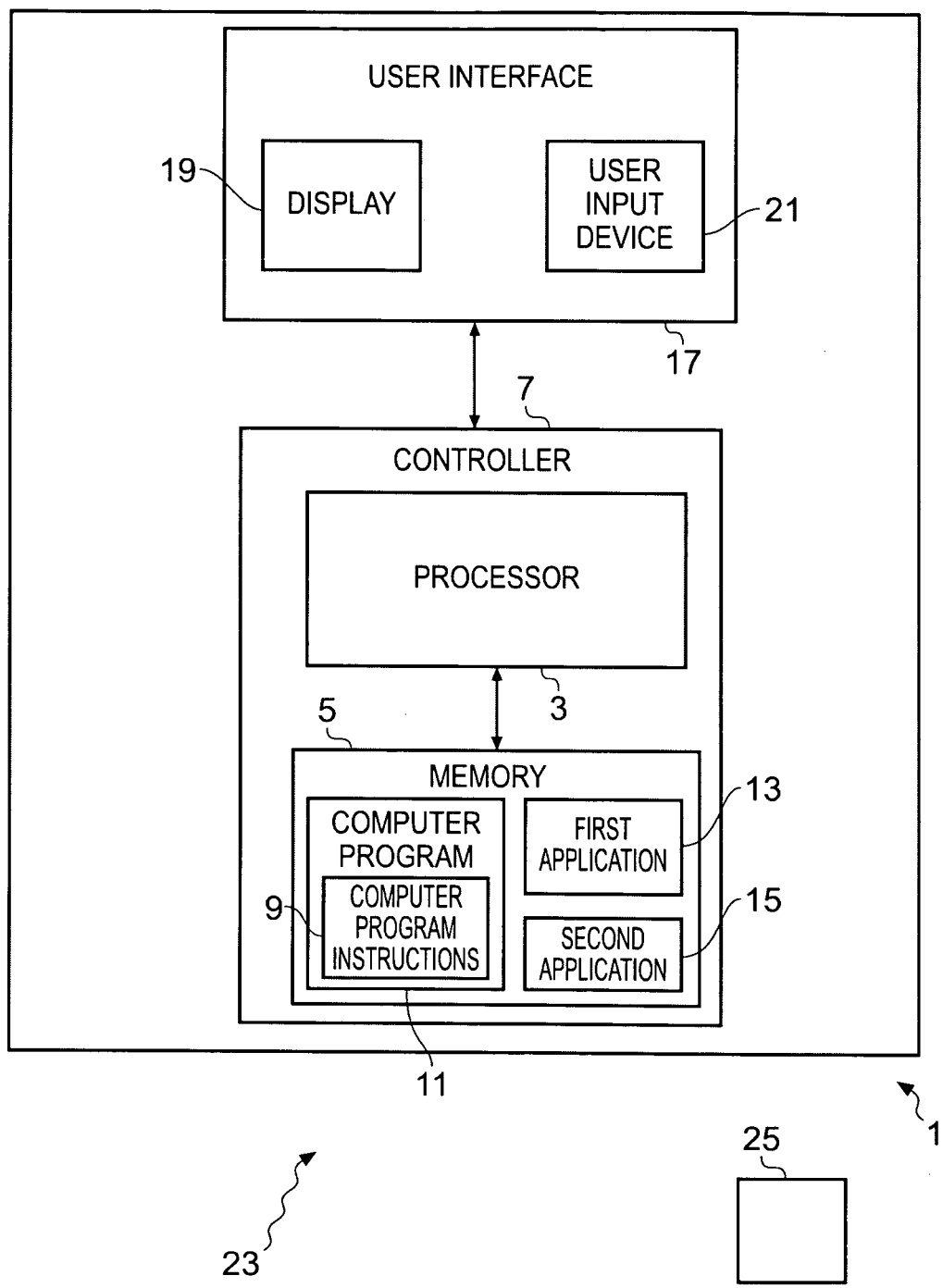
FIG. 1 schematically illustrates an apparatus according to an embodiment of the invention.

The Figures illustrate a method comprising: obtaining 39 coordinate information from a first application 13 where the coordinate information uniquely identifies an address as a location in a coordinate space; storing 41, using a second application 15, the coordinate information so that the coordinate information is associated with contact information indicative of the address; detecting user selection of a control element associated with the stored contact information; and in response to the detection of the user selection of the control element providing 49 the coordinate information to the first application 13.

FIG. 1 schematically illustrates an apparatus 1 according to an embodiment of the invention. The apparatus 1 may be an electronic apparatus. Only features referred to in the following description are illustrated. It should, however, be understood that the apparatus 1 may comprise additional features that are not illustrated. The apparatus 1 may be, for example, a mobile cellular telephone, a personal computer, a global positioning system (GPS) device or a navigation device or any other apparatus that enables a user to access stored contact information and also to find and view locations within a coordinate space. The apparatus 1 may be a handheld apparatus 1 which can be carried in a user's hand, handbag or pocket.

The illustrated apparatus 1 comprises: a user interface 17 and a controller 7. In the illustrated embodiment the controller 7 comprises a processor 3 and a memory 5 and the user interface 17 comprises a display 19 and a user input device 21.

The controller 7 provides means for controlling the apparatus 1. The controller 7 may be implemented using instructions that enable hardware functionality, for example, by using executable computer program instructions 9 in a general-purpose or special-purpose processor 3 that may be stored on a computer readable storage medium 25 (e.g. disk, memory etc) to be executed by such a processor 3.

The processor 3 is configured to receive input commands from the user interface 17 and also to provide output commands to the user interface 17. The processor 3 is also configured to write to and read from the memory 5.

The user interface 17 provides means for enabling a user to make inputs which may be used to control the apparatus 1.

The display 19 is configured to enable information to be displayed to a user of the apparatus 1. The information may comprise items such as text, images or user selectable icons. The information may comprise information which is stored in the memory 5. The information may comprise information which has been input by the user using the user input device 21 or information which has been received by the apparatus 1 from another apparatus such as a remote server.

The display 19 may also be configured to display a representation of a coordinate space such as a map 75. The display 19 may be configured to display icons on the map indicative of addresses or specific locations. Information relating to the coordinate space and the addresses may be stored in the memory 5. In some embodiments of the invention information relating to the coordinate space and the locations within the coordinate space may be received from a remote apparatus such as a remote server.

The display 19 is also configured to present graphical user interfaces 61 to a user. Examples of graphical user interfaces 61 which may be presented on the display 19 are illustrated in FIGS. 3A to 3H, 4A to 4B and 6A to 6I.

The user input device 21 may be any means which enables a user to input information into the apparatus 1. For example the user input device 21 may comprise a touch sensitive user input device such as a touch sensitive display. In some embodiments of the invention the touch sensitive user input device 17 may be integrated with the display 15 to form a touch sensitive display 15. In other embodiments of the invention the user input device may comprise one or more keys, a keypad, a joystick, a roller key or any other type of user input.

The output of the user input device 21 may be provided as an input to the controller 7.

The memory 5 stores a computer program 11 comprising computer program instructions 9 that control the operation of the apparatus 1 when loaded into the processor 3. The computer program instructions 9 provide the logic and routines that enables the apparatus 1 to perform the methods illustrated in FIGS. 2 and 5. The processor 3 by reading the memory 5 is able to load and execute the computer program 11.

The computer program instructions 9 may provide computer readable program means for obtaining coordinate information from a first application 13 where the coordinate information uniquely identifies an address as a location in a coordinate space.

The computer program instructions 9 may also provide computer readable program means for storing, using a second application 15, the coordinate information so that the coordinate information is associated with contact information indicative of the address; means for detecting user selection of a control element associated with the stored contact information; and means for providing, in response to the detection of the user selection of the control element, the coordinate information to the first application 13.

The computer program 11 may arrive at the apparatus 1 via any suitable delivery mechanism. The delivery mechanism may be, for example, a computer-readable storage medium, a computer program product 25, a memory device, a record medium such as a CD-ROM or DVD, an article of manufacture that tangibly embodies the computer program 11. The delivery mechanism may be a signal 23 configured to reliably transfer the computer program 11. The apparatus 1 may propagate or transmit the computer program 11 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

In the illustrated embodiment the memory 5 also stores a first application 13 and a second application 15. In other embodiments of the invention the first application 13 may be stored in a different apparatus 1 such as a remote server. The applications 13, 15 may be computer programs designed to perform specific functions.

The first application 13 may be a map application. The map application 13 may enable representations of coordinate spaces, such as maps 75 or satellite images, to be displayed on the display 19. The map application 13 may enable specific locations such as addresses to be found within the coordinate space and may indicate these locations on the display. The map application 13 may also enable a user to perform functions in relation to a specific location. For example, the map application 13 may enable the user to navigate between the specific location and one or more other locations. The map application 13 may also enable the user to locate businesses or points of interest near to a specific location.

The second application 15 may be a database application. The database application 15 may be any application which enables a user of the apparatus 1 to store information such as an address book or a calendar. The information which is stored using the database application 15 may comprise information which has been input by a user of the apparatus 1. In some embodiments of the invention the information stored using the database application 15 may also comprise information which has been received by the apparatus 1.

The information stored using the database application 15 may comprise contact information. The contact information may be any information which enables a person or a location to be contacted. The contact information may be stored in a plurality of records. Each record may correspond to a different person, location or event. Each record may comprise one or more pieces of information relating to the person, location or event. For example, the record may comprise a persons name, telephone number, email address and home or work address.

An interface may be provided between the two applications 13, 15 to enable data to be exchanged between the two applications 13, 15. The interface may be provided by the computer program 11.

Figure 2:
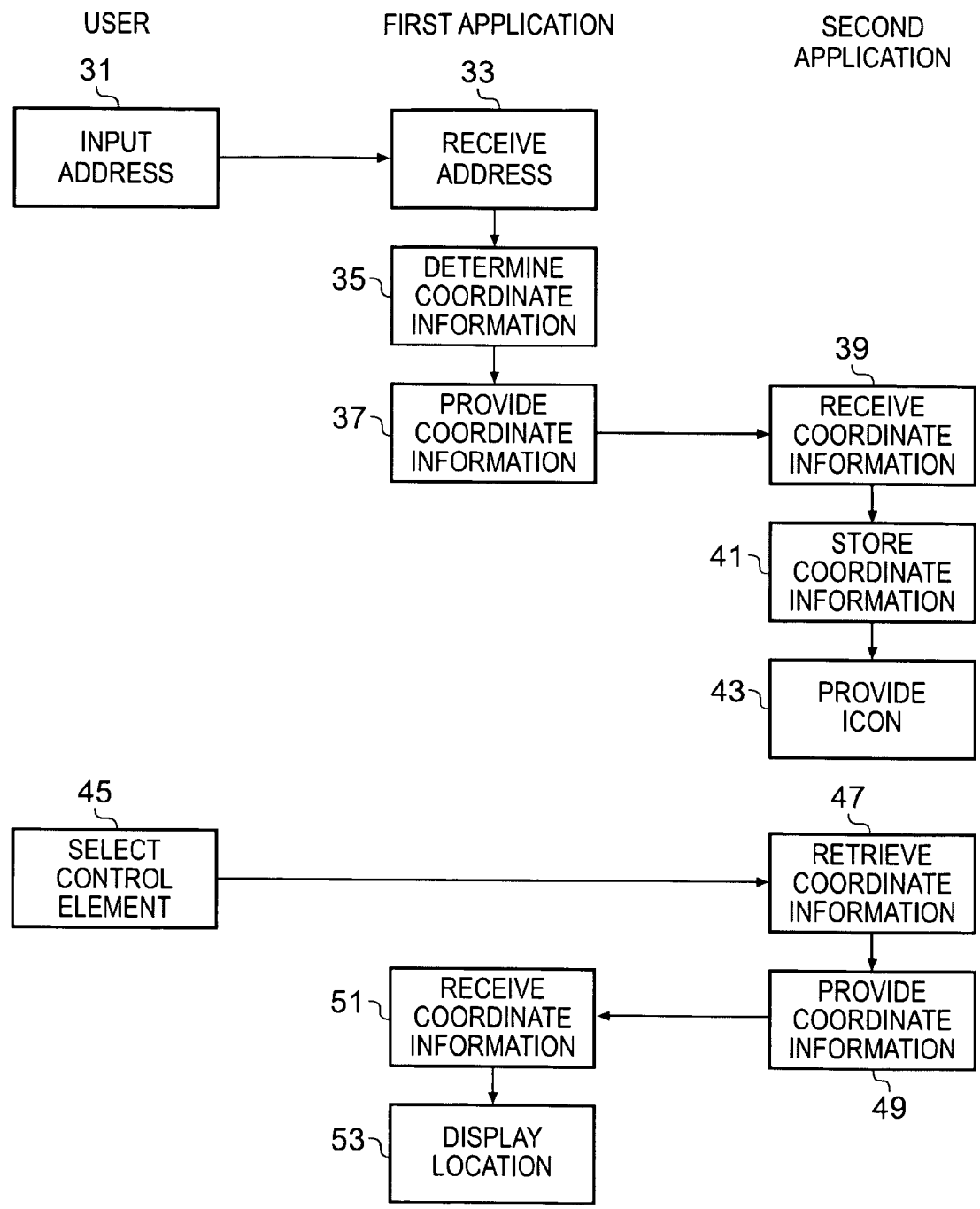
FIG. 2 is a block diagram which schematically illustrates a method according to an embodiment of the invention.
Figure 5:
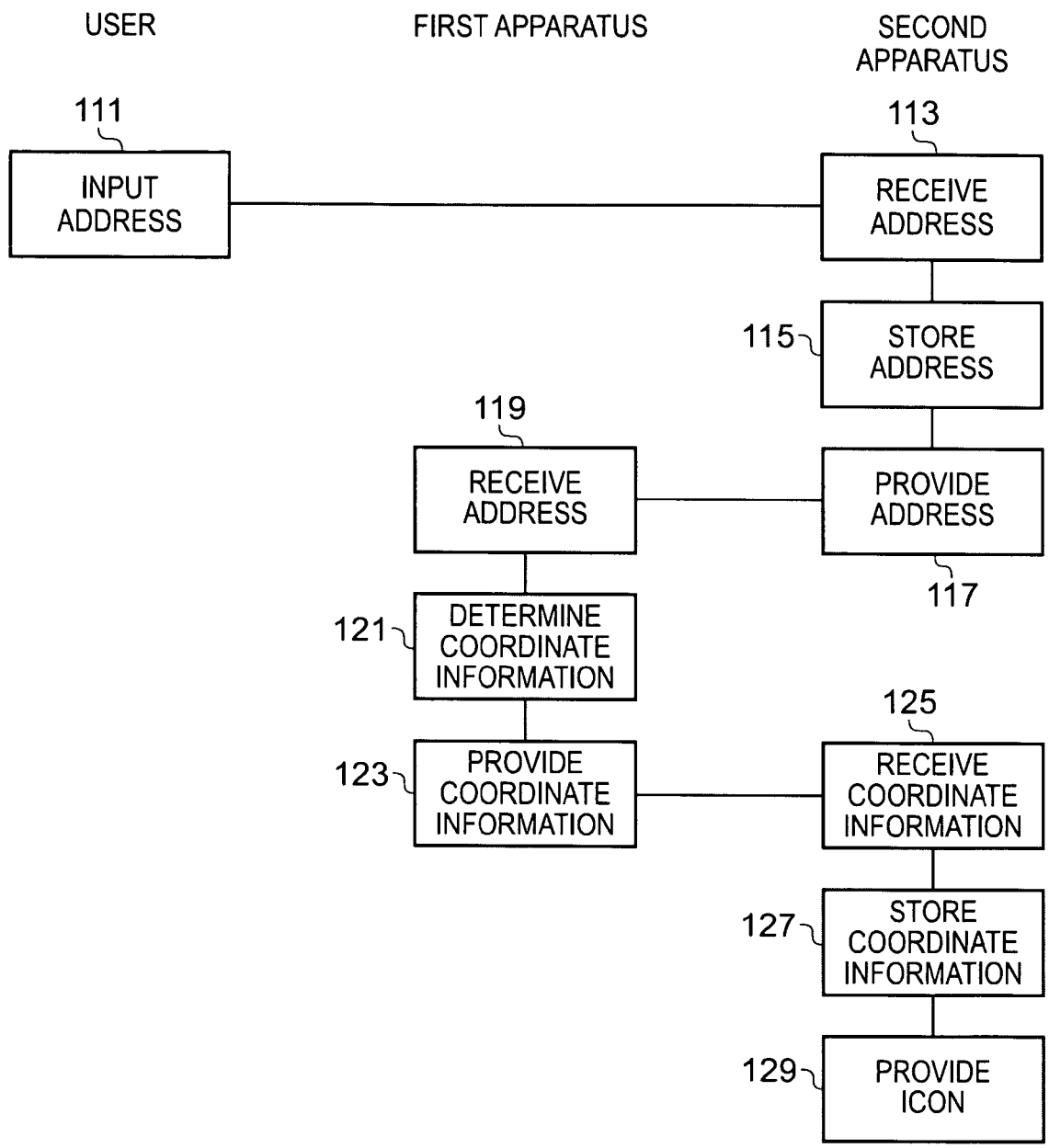
FIG. 5 is a block diagram which schematically illustrates a method according to a further embodiment of the invention.

Methods of controlling the apparatus 1, according to embodiments of the invention, are illustrated schematically in FIGS. 2 and 5.

In the method illustrated in FIG. 2 blocks 31 and 45 are carried out by the user, blocks 33, 35, 37, 51 and 53 are carried out using the first application 13 and blocks 39, 41, 43, 47 and 49 are carried out using the second application 15.

At block 31 the user uses the user input device 21 to input an address into the apparatus 1. The address may be input as series of alphanumeric characters. The address may comprise a code such as a post code or a zip code. The address may also comprise numerical information such as a house number and names such as the name of a street or town or business.

In the exemplary embodiment illustrated in FIG. 2 the address is provided directly to the first application so that at block 33 the first application 13 receives the address.

At block 35 the first application is used to determine coordinate information for the address. The coordinate information uniquely identifies a location in a coordinate space corresponding to the address. In some embodiments of the invention the input address may correspond to only one location in the coordinate space and so this location may be determined automatically without any further user input after the address has been entered. Once the coordinate information has been determined the location may be displayed on the display 19.

In other embodiments of the invention the address input by the user might not be specific enough to enable a single location within the coordinate space to be identified. In such embodiments a plurality of options of possible addresses may be presented to the user and the user may be able to select an address and corresponding coordinate information from the plurality of options. In some embodiments of the invention the user may be able to view the locations corresponding to the candidate addresses before confirming a selection.

Once the location and corresponding coordinate information have been determined the coordinate information is provided to the second application at block 37. In some embodiments of the invention the text which comprises the address may also be provided to the second application 15. The text may be the text which was input by the user, or text which has been found by the first application 13 which relates to the specific location.

At block 39 the second application 15 receives the coordinate information from the first application 13 and so obtains coordinate information. As mentioned above, the second application 15 may also receive text which comprises the address.

At block 41 the second application is used to store the coordinate information. In embodiments of the invention the coordinate information is associated with a record 67 of contact information so that when the record 67 of contact information is displayed the coordinate information may also be accessed. Any text obtained from the first application 13 may also be stored within the record 67 of contact information.

Once the coordinate information has been stored and associated with a record 67 of contact information an icon 72 may be associated, at block 43, with the record 67 of contact information. The icon 72 may be displayed whenever the record 67 of contact information is displayed on the display 19. The icon 72 may indicate that coordinate information is associated with the record 67 and that the address stored in the record 67 of contact information has been validated. This provides a confirmation to the user that they can easily view the address and perform any functions upon the validated address without having to carry out a further search.

At block 45 the user of the apparatus 1 uses the user input device 21 to select a control element. There may be a time interval between block 43 and block 45. The time delay may be a short period of time such as minutes or seconds or a longer period of time such as weeks or months.

The control element may be any user selectable option which enables the coordinate information associated with a record 67 of contact information to be accessed. For example the control element may be an icon which is presented on the display 19 when the record of the contact 67 information is displayed. In other embodiments of the invention control element may be a menu option which may be accessed when the record of contact information is displayed on the display 19 or the control element may be an item in a list which may be selected by actuating the user input device 21.

The controller 7 detects the selection of the control element and, in response to the detection of the selection of the control element uses the second application 15 to access and retrieve, at block 47, the stored coordinate information. At block 49 the retrieved coordinate information is provided to the first application 13.

At block 51 the first application receives the retrieved coordinate information and, at block 53, uses the retrieved coordinate information to display the location corresponding to the coordinate information on the display 19.

FIGS. 3A to 3H illustrate an embodiment of the invention, according to the above described method, in use.

Figure 3A:
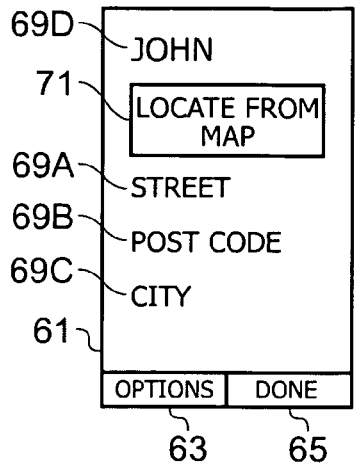
FIGS. 3A to 3H illustrate an embodiment of the invention in use.

FIG. 3A illustrates a graphical user interface 61 which is displayed on the display 19 in a first embodiment of the invention. In the embodiment illustrated in FIGS. 3A to 3H the user input device 21 may comprise touch sensitive portions of the display 19 so the user can select options by actuating the appropriate portions of the display 19. The user input device 21 may also comprise a keypad which enables a user to input alphanumeric characters.

In the graphical user interface 61 illustrated in FIG. 3A the user has accessed a database application 15 and a record 67 of contact information is displayed on the display 19. The record of contact information comprises a plurality of fields 69A, 69B, 69C and 69D. The field 69D corresponds to the name of the person associated with the record 67 of contact information. In the illustrated embodiment the record is associated with "John". The record 67 may comprise additional information which is not presented in the graphical user interface 61 displayed in FIG. 3A.

In the graphical user interface 61 displayed in FIG. 3A the fields 69A, 69B, and 69C correspond to parts of John's address. In FIG. 3A the user has not input this information yet so these fields are empty.

A plurality of user selectable options are also presented in the graphical user interface 61 in FIG. 3A. A first user selectable option 63 is displayed at the lower left hand corner of the display 19 and a second user selectable 65 option is displayed at the lower right hand corner of the display 19. These user selectable options 63, 65 may correspond to soft keys and the functions associated with these options 63, 65 may depend upon the status of the apparatus 1. In the example illustrated in FIG. 3A the first user selectable option 63 is associated with "options" such that selection of the first user selectable option 63 enables a user to access a menu of options of functions which may be performed on the record 67 of contact information. The second user selectable option 65 enables a user to exit the database application 15.

The third user selectable option 71 is presented within the record 67 of contact information. The third user selectable option 71 enables a user to access the map application 13.

Figure 3B:
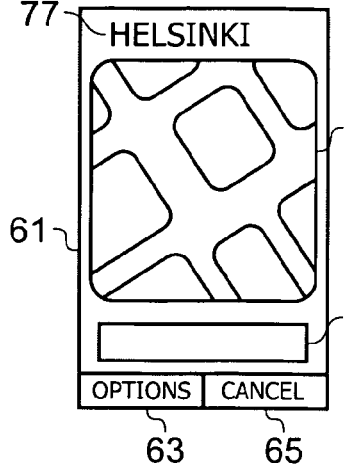

In response to the selection of the third user selectable option 71 the controller 7 accesses the map application 13 and controls the display 19 to display the graphical user interface 61 illustrated in FIG. 3B.

The graphical user interface 61 in FIG. 3B also comprises the first user selectable option 63 in the lower left hand corner of the display 19 and the second user selectable 65 option in the lower right hand corner of the display 19. In FIG. 3B the first user selectable option 63 is still associated with "options" however the function associated with the second user selectable option 65 has changed. The second user selectable option 65 is now associated with the function "cancel" which enables the user to stop a function from being performed and return the apparatus 1 to the previous status.

The graphical user interface 61 also comprises a text entry field 73 the text entry field enables a user to input text into the apparatus 1. The text may be any information which may be used to find a specific location in the coordinate space. For example the text may be the name of a business or a type of business, part of an address such as a street name and house number or a code such as a post code or zip code.

In the graphical user interface illustrated in FIG. 3B a portion of a map 75 is also displayed on the display 19. The map is a graphical representation of a coordinate space. Other representations of coordinate spaces may also be used such as satellite images. The user input device 21 may be configured to enable a user to scroll across the map 75 or to zoom in and out of the map 75.

A label 77 indicates the region presented on the map 75. In the illustrated embodiment the label 77 indicates that the map 75 is of Helsinki.

Figure 3C:
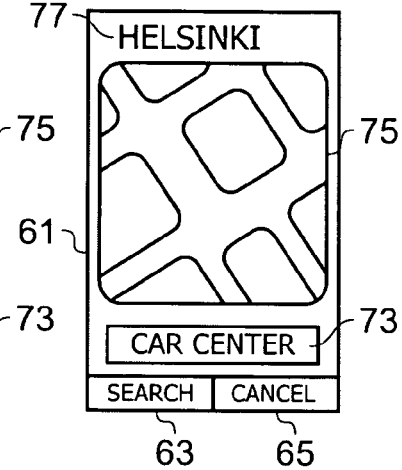

In FIG. 3C the user has input 31 the text "car center" into the text entry field 73. The graphical user interface 61 in FIG. 3C is the same as the graphical user interface in FIG. 3B except that, now text has been entered in to the text entry field 73 the function associated with the first user selectable option 63 has changed from "options" to "search". Selection of the first user selectable option 63 now enables the controller 7 to use the map application 13 to search for a location corresponding to the text in the text entry field 73.

Figure 3D:
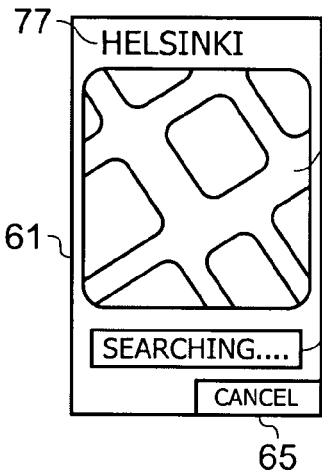

In FIG. 3D the user has selected the first user selectable option 63 and the search is being carried out. The graphical user interface 61 illustrated in FIG. 3D is the same as that in FIG. 3E except that a notification 79 is now displayed on the display 19 indicating that the search is being carried out and text entry field 73 and the first user selectable option 63 are not displayed because the search is being carried out. The second user selectable option 65 is still displayed because this enables the user to cancel the search.

Figure 3E:
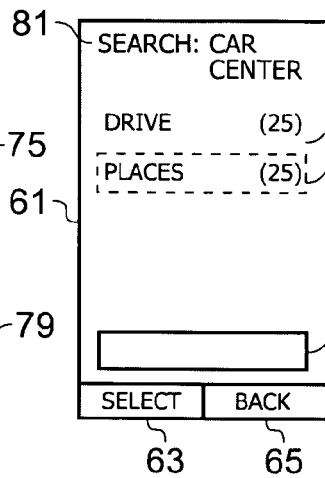

In the graphical user interface illustrated in FIG. 3E the search has been completed and a summary of the results of the search are displayed on the display 19. A label 81 is displayed indicating the text that was used to carry out the search. A summary 83 of the results of the search is displayed beneath the label 81. In the illustrated example the user only entered the words "car center". As this is not a specific address the search has found a plurality of possible locations which correspond to the search term "car center" rather than one single location. The summary 83 of the results groups the found locations into types of locations. This enables a user to find the location they want more easily. A list 84 is provided of all the types of locations that have been found. The list 84 may also provide an indication of the number of each of the types of locations that have been found for example, in the illustrated embodiment, the summary 83 of the results indicate that 25 places have been found.

The user may be able to scroll through the list 84 using the user input device 21. As the user scrolls through the list 84 different items in the list 84 may be highlighted. Once an item in the list 84 has been highlighted it may be selected so that a function may be performed on it.

In the graphical user interface presented in FIG. 3E the text entry field 73 is displayed. This enables the user to carry out another search, for example if the results are not what they were expecting.

The first user selectable option 63 and the second user selectable 65 option are also displayed. In FIG. 3E the first user selectable option 63 is associated with the function "select". Actuation of the first user selectable option 63 enables the user to select the currently highlighted item from the results summary 83 and view the item in more detail. The second user selectable option 65 is now associated with the function "back" which enables the apparatus to return the graphical user interface 61 illustrated in FIG. 3B.

Figure 3F:
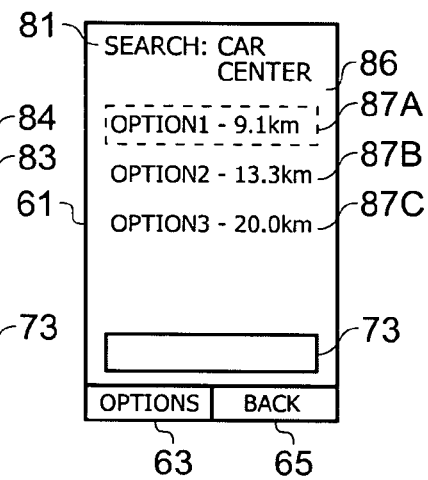

In the graphical user interface illustrated in FIG. 3F the user has actuated the first user selectable option 63 and the search results 85 are presented in more detail. The label 81 indicating the text that was used to carry out the search is also presented.

The detailed search results 85 are presented as a list 86 of items 87A, 87B and 87C which may be selected. Each of the items 87A, 87B and 87C in the list corresponds to a location in the coordinate space. In some embodiments of the invention details of the locations may also be displayed, for example, the specific addresses of the locations or an indication of the distance between the user of the apparatus 1 and the location. In the illustrated embodiment an indication of the distance between the user of the apparatus 1 and the locations in the list 86 is displayed on the display. This may enable the user to quickly select the location closest to them.

The user may be able to use the user input device 21 to scroll through the list 86 to view all items on the list 86. The user may also be able to highlight different items 87A, 87B and 87C in the list as they scroll through the list. Once an item 87A, 87B and 87C has been highlighted it may be selected using the first user selectable option 63.

In the graphical user interface presented in FIG. 3F the text entry field 73 is displayed. This enables the user to carry out another search if, for example, they are unable to find the location they wanted in the list 86.

The first user selectable option 63 and the second user selectable 65 option are also displayed. In FIG. 3F the first user selectable option 63 is associated with the function "options". Actuation of the first user selectable option 63 enables the user to access a menu of functions which may be performed on the highlighted item in the list 86. The second user selectable option 65 is associated with the function "back" which enables the apparatus 1 to return to the graphical user interface 61 illustrated in FIG. 3E.

Figure 3G:
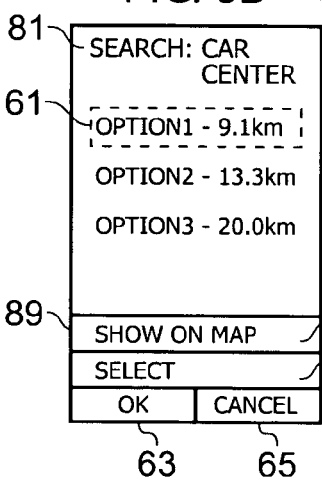

In FIG. 3G the user has selected the first user selectable option 63. The menu 89 of options is now presented on the display. A first menu option 91A enables the highlighted location from the results list to be displayed on a map. This enables a user to determine whether or not the selected location is the correct location.

A second menu option 91B enables the user to select the highlighted location. Selecting the location controls the apparatus 1 to provide 37 the coordinate information of the selected location to the database application. In the illustrated embodiment of the invention the map application may also provide 37 the address as well as the coordinate information to the database application.

A user may be able to use the user input device 21 to scroll though the menu 89 of options. Different options in the menu 89 of options may be highlighted as the user scrolls through the menu.

In the graphical user interface illustrated in FIG. 3G the function associated with the first user selectable option 63 is now "OK". Actuation of the first user selectable option 63 enables the highlighted menu option to be selected and the associated function to be performed on the highlighted item 87A from the list 86.

The function associated with the second user selectable option 65 is "cancel". Actuation of the second user selectable option 65 enables the apparatus 1 to exit the menu 89 of options and return to the graphical user interface illustrated in FIG. 3F without performing a function on the highlighted item 87A in the list.

Figure 3H:
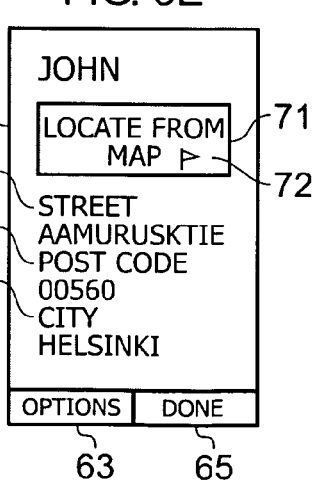

In FIG. 3H the user has selected the highlighted item 87A from the list by selecting the "select" menu option 91B from the menu 89 of options. The controller 7 has now accessed the database application 15 again and the graphical user interface 61 illustrated in FIG. 3H is displayed. The graphical user interface 61 in FIG. 3H is similar to the graphical user interface in FIG. 3A. However in FIG. 3H the coordinate information and the corresponding address have been received 41 by the database application 15 and stored 43 in the memory 5. The received address information has been used to fill in the respective fields 69A, 69B and 69C of the record 67 of contact information.

The coordinate information is associated with the record 67 of contact information and is stored so that when the record 67 is displayed on the display 67 the coordinate information may also be accessed. The coordinate information may be stored in the memory 5. An icon 72 is displayed in the record to indicate that coordinate information is associated with the record 67 of contact information and that the address has been validated as a full and correct address. This enables a user to easily determine which addresses stored using the database application 15 are validated addresses.

FIGS. 4A and 4B illustrate an embodiment of the invention in use.

In FIG. 4A the method illustrated in FIGS. 3A to 3H, or an analogous method, has already been carried out so that the coordinate information associated with the record of contact information for John is stored.

In FIG. 4A the user has accessed the record 67 of contact information. The graphical user interface 61 illustrated in FIG. 4A comprises a first user selectable option 63 displayed in the lower left hand corner of the display 19 and a second user selectable 65 option displayed in the lower right hand corner of the display 19. In the example illustrated in FIG. 4A the first user selectable option 63 is associated with "options" such that selection of the first user selectable option 63 enables a user to access a menu of options of functions which may be performed on the record 67 of contact information. The second user selectable option 65 enables a user to exit the database application 15.

The record 67 of contact information comprises a plurality of items 101A, 101B, 101C and 101D. Each of the items comprises a control element which may be selected by the user to enable information associated the record 67 of contact information to be used to perform a function. For example, selection of the first item 101A enables a telephone number to be used to send a message to John. The second item 101B enables a telephone number to be used to make a telephone call to John. The third item 101C enables an email address from the record 67 of contact information to be used to send an email message to John. The fourth item 101D enables the coordinate information which has been stored previously to be used to display the location on the display 19.

In the illustrated embodiment the user uses the user input device 21 to make an input and select 45 the fourth item 101D. In response to detection of the user input the controller 7 accesses the map application 13 and controls the display 19 to display the graphical user interface 61 illustrated in FIG. 4B.

In response to the detection of the user input the controller 7 also retrieves 47 the coordinate information associated with the record 67 of contact information and provides 49 the coordinate information to the map application 13.

The map application 13 receives 51 the coordinate information and uses the coordinate information to enable the location corresponding to the address stored in the record of contact information to be displayed 53 without requiring a further search to be carried out. This enables the user interface 61 illustrated in FIG. 4B to be displayed immediately without any intervening interfaces in which the user has to input further search terms, make any further selections or wait while a search is carried out.

In the graphical user interface 61 illustrated in FIG. 4B a map is displayed in which the location corresponding to an address stored in the record 67 of contact information. An icon 102 is displayed indicative of the address. The first user selectable option 63 and the second user selectable option 65 are displayed as in previously described embodiments.

Therefore embodiments of the invention as described above provide a way of enabling a user to quickly access a map of a location corresponding to a stored address. By storing the coordinate information and associating this with the contact information this enables the location to be displayed quickly and easily with very few user inputs making the apparatus 1 easier and more intuitive for a user to use.

Also, embodiments of the invention enable a user to quickly and easily check whether or not they have a correct and full address by finding the address in the map application.

Also embodiments of the invention provide shortcuts between various applications of the apparatus which makes the apparatus quicker and easier for a user to use.

Another method of controlling the apparatus 1 according to an embodiment of the invention is illustrated schematically in FIG. 5.

In the method illustrated in FIG. 5 block 111 is carried out by the user, blocks 119, 121, and 123 are carried using the first application 13 and blocks 113, 115, 117, 125, 127 and 129 are carried out using the second application 15.

At block 111 the user uses the user input device 21 to input an address into the apparatus 1. As in the method described above the address may be input as series of alphanumeric characters. The address may comprise a code such as a post code or a zip code. The address may also comprise numerical information such as a house number and names such as the name of a street or town or business or type of business.

At block 113 the second application 15 receives the address and at block 115 the address is stored using the second application 15. The address may be saved as items of information in a record 67 of contact information.

At block 117 the address information is provided to the first application 13. The address information may be provided in response to a further user input. For example the user may make an input indicating that they wish to view the address in a map. Alternatively the address information may be provided to the first application 13 automatically without any intervening user input, to enable the address to be validated as a correct address.

At block 119 the first application 13 receives the address information and at block 121 determines coordinate information for the address. As in the previous example, the coordinate information uniquely identifies a location in a coordinate space corresponding to the address. In some embodiments of the invention the input address may correspond to only one location in the coordinate space and so this location may be determined automatically.

In other embodiments of the invention the input address might not be specific enough to enable a single location within the coordinate space to be identified. In such embodiments a plurality of options of possible addresses may be presented to the user and the user may be able to select the correct address and corresponding coordinate information from the plurality of options. In some embodiments of the invention the user may be able to view the selected address on the display 19.

Once the location and corresponding coordinate information have been determined the coordinate information is provided to the second application 15 at block 123. In some embodiments of the invention the text which comprises the address may also be provided to the second application 15. For example where the address provided to the first application 13 was not specific enough to enable a single location to be identified further address information may be provided when the user selects the location.

At block 125 the second application 15 receives the coordinate information from the first application 13 and so obtains coordinate information. As mentioned above, the second application 15 may also receive text which enables the address to be completed.

At block 127 the second application is used to store the coordinate information. The coordinate information is associated with the record of contact information in which the address information is stored so that when the record 67 of contact information is displayed the coordinate information may also be accessed. Any text or further address information obtained from the first application 13 may also be stored within the record 67 of contact information.

Once the coordinate information has been stored and associated with a record of contact information an icon may be associated, at block 129, with the record of contact information so that whenever the record of contact information is displayed on the display 19 the icon is also displayed. The icon may indicate that coordinate information is associated with the record and the address within the record of contact information has been validated. This provides a confirmation to the user that they can easily view the address and perform any functions upon the validated address.

FIGS. 6A to 6I illustrate an embodiment of the invention illustrated in FIG. 5 in use.

Figure 6A:
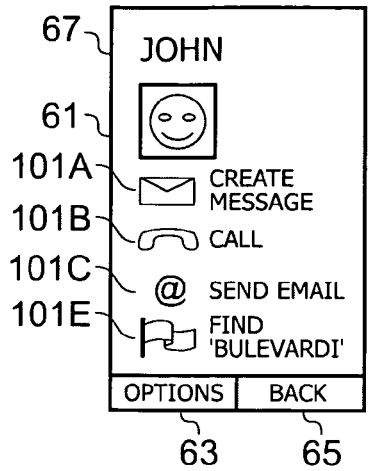
FIGS. 6A to 6I illustrate the further embodiment of the invention in use.

In FIG. 6A the user has accessed the record 67 of contact information corresponding to John. The user has already input 111 some address information. However in this example the address information is only a street name and not a complete address which is not specific enough to define a unique location in the coordinate space. The input information is received 113 by the second application and stored 115 in the record 67 of contact information.

The graphical user interface 61 in FIG. 6A also comprises a first user selectable option 63 and a second user selectable option 65. As in the previously described embodiments the first user selectable option 63 is displayed in the lower left hand corner of the display 19 and the second user selectable 65 option is displayed in the lower right hand corner of the display 19. In the example illustrated in FIG. 6A the first user selectable option 63 is associated with "options" such that selection of the first user selectable option 63 enables a user to access a menu of options of functions which may be performed on the record 67 of contact information. The second user selectable option 65 enables a user to exit the database application 15.

The record 67 of contact information comprises a plurality of items 101A, 101B, 101C and 101E. Each of the icons is a control element which may be selected by the user to enable information associated the record 67 of contact information to be used to perform a function. For example, selection of the first item 101A enables a telephone number to be used to send a message to John. The second item 101B enables a telephone number to be used to make a telephone call to John. The third item 101C enables an email address from the record 67 of contact information to be used to send an email message to John. The fourth item 101E enables the user to access the map application and find the address which has not been validated on the map. As the address has not yet been validated the item 101E looks different to the item 101D as illustrated in FIG. 4A. The item 101D in FIG. 4A comprises a flag whereas the item in FIG. 101E in 6A comprises a blank square. It is to be appreciated that in other embodiments of the invention different icons could be used to indicate whether or not an address has been validated.

Figure 6B:
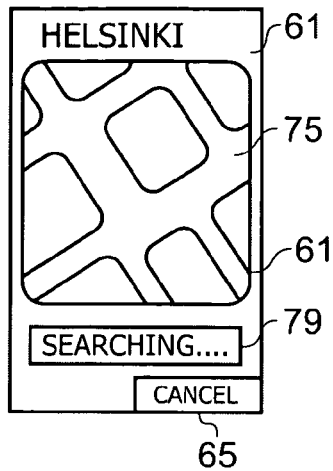

The user makes a user input to select the icon 101C so that the controller 7 accesses the map application 13 and the graphical user interface 61 illustrated in FIG. 6B is displayed on the display 19. The address information is provided 112 from the database application to the map application. Once the map application has received 119 the address information it will search for locations corresponding to the address.

In the graphical user interface 61 illustrated in FIG. 6B a portion of a map 75 is displayed. An icon 79 is displayed on the display 19 indicating that the search is being carried out. The first user selectable option 63 is not displayed in the graphical user interface 61 illustrated in FIG. 6B because the search is being carried out. The second user selectable option 65 is still displayed because this enables the user to cancel the search.

Figure 6C:
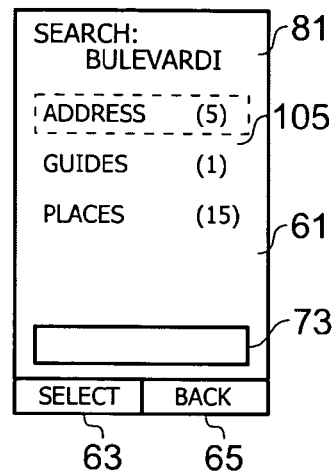

Once the search has been completed the graphical user interface 61 illustrated in FIG. 6C is displayed in which the results of the search are presented. A label 81 is displayed indicating the text that was used to carry out the search. The text may be the text that was stored in the address field of the record 67 of contact information.

As in the previously described embodiment a summary 83 of the results of the search is displayed beneath the label 81. As the address used to carry out the search is not specific enough to find a single location the search has found a plurality of different locations that may correspond to the address the user wants. In the results summary the locations are grouped in types of locations, for example, address, guides and places. The different types of locations are presented as user selectable options in a list 105.

In the graphical user interface presented in FIG. 6C the text entry field 73 is displayed. This enables the user to carry out another search, for example if the results are not what they were expecting.

The first user selectable option 63 and the second user selectable 65 option are also displayed. In FIG. 6C the first user selectable option 63 is associated with the function "select". Actuation of the first user selectable option 63 enables the user to select an item from the list 105 and view the item in more detail. The second user selectable option 65 is now associated with the function "back" which enables the apparatus to return the graphical user interface 61 illustrated in FIG. 6A.

Figure 6D:
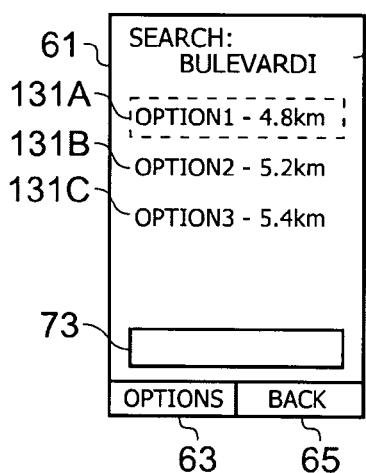

In the graphical user interface 61 illustrated in FIG. 6D the user has actuated the first user selectable option 63 and a portion of the search results 85 are presented in more detail. The label 81 indicating the text that was used to carry out the search is also presented.

As in the previously described embodiments the detailed search results 85 are presented as a list of items 131A, 131B and 131C which may be selected. Each of the items 131A, 131B and 131C in the list corresponds to a location in the coordinate space. In some embodiments of the invention the items 131A, 131B and 131C in the list may comprise details of the locations. For example the items 131A, 131B and 131C in the list may comprise the address of the location or an indication of the distance between the user of the apparatus 1 and the location. The user may be able to use the user input device 21 to scroll through the list to view all items on the list. The user may also be able to highlight different items 131A, 131B and 131C in the list as they scroll through the list. Once an item 131A, 131B and 131C has been highlighted it may be selected using the first user selectable option 63 as illustrated in FIG. 6E.

In the graphical user interface presented in FIG. 6D the text entry field 73 is displayed. This enables the user to carry out another search if, for example, they are unable to find the location they wanted in the list.

Figure 6E:
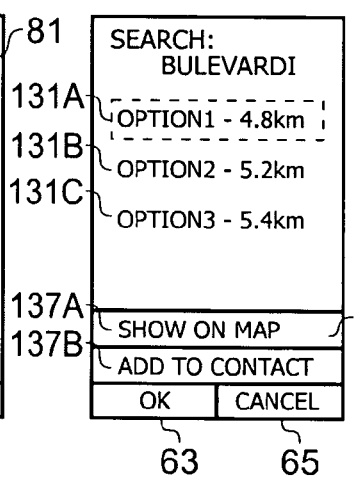

Once the user has highlighted an item 131A from the list and selected the first user selectable option 63 the graphical user interface 61 illustrated in FIG. 6E is displayed in which a menu of options 135 is provided. A user may use the user input device 21 to scroll through the menu of options 135. A user may use the first user selectable option 63 to select an option 137A, 137B from the menu of options 135.

Figure 6F:
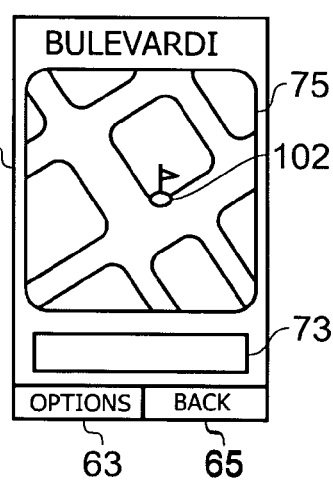

In the illustrated embodiment selection of the first menu option 137A controls the apparatus 1 to display the highlighted location on a map. This enables a user to view the search results on a map before confirming selection of the location. FIG. 6F illustrates an example of a graphical user interface 61 which may be presented after the user has selected the first menu option 137A. In the graphical user interface 61 in FIG. 6F a map 75 is displayed and an icon 102 indicating the highlighted location on the map 75 is also displayed.

Figure 6G:
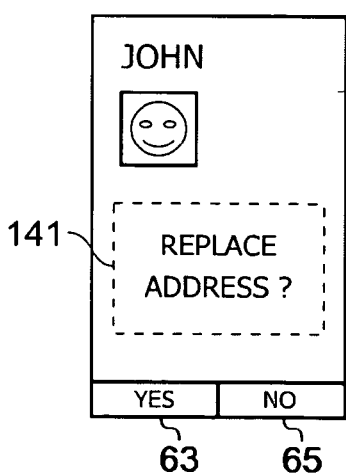

The second menu option 137B controls the apparatus 1 to add the highlighted location to a record 67 of contact information. FIG. 6G illustrates an example of a graphical user interface 61 which may be presented after the user has selected the first menu option 137A. In FIG. 6G the apparatus has accessed the database application and so the graphical user interface in FIG. 6G is similar to the graphical user interface 61 in FIG. 6A. In FIG. 6G a confirmation query 141 is displayed which asks for confirmation whether or not the user wishes to replace the location information currently stored in the record 67 of contact information with the information received from the map application 13. The user may use the user selectable options 63, 65 to confirm or cancel the replacement address.

Figure 6H:
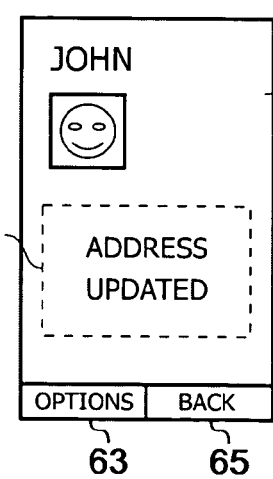
Figure 6I:
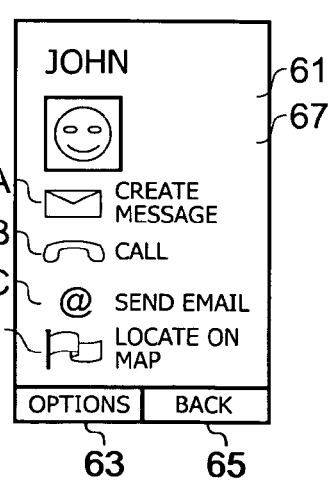

In the illustrated embodiment the user confirms the replacement address by selecting the first user selectable option 63 and the graphical user interface 61 illustrated in FIG. 6H is displayed. The graphical user interface 61 in FIG. 6H comprises a notification 143 which confirms that the database application 15 has received the address and coordinate information from the map application 13. The address information and the coordinate information have been stored 127 and the address in the record of contact information has been updated. The apparatus then displays the graphical user interface 61 illustrated in FIG. 6I. The graphical user interface 61 in FIG. 6I is similar to the graphical user interface 61 in FIG. 6A except that now the address has been validated an icon 72 indicating this is displayed and the user now has the option of locating the address directly on the map.

The blocks illustrated in the FIGS. 2 and 5 may represent steps in a method and/or sections of code in the computer program 11. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example in the embodiments of the invention as described above the user uses address information saved in a contacts application. It is to be appreciated that the address information may be obtained from other applications such as a calendar or diary application. For example a user may receive and store a message containing an invitation to an event. The invitation may contain address information relating to the location of the event. The user may use an embodiment of the invention described above to validate the address and once the address has been validated provide an indication to the user that the address has been validated.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   in a first computer-executed step, automatically providing contact information to a first application that comprises a map application in response to a user entering the contact information by inputting text into a user input a device, the inputted text being descriptive of an address to be stored in a record of a database of a second application, the second application comprising at least one of an address book application and a calendar application;
   in a second computer-executed step, validating the input contact information by obtaining coordinate information from the first application, where the coordinate information uniquely identifies the address as a location in a coordinate space;
   in a third computer-executed step, providing the obtained coordinate information from the first application to the second application and storing, using the second application, the coordinate information in the database of the second application so that the coordinate information is associated with the address in the record, wherein the automatically providing the contact information, validating the input contact information, providing the obtained coordinate information and storing the coordinate information are performed without further user input after entering the contact information;
   in a fourth computer-executed step, the second application responding to user selection of a control element associated with the record to retrieve the stored coordinate information from the record and provide the retrieved coordinate information to the first application; and
   in a fifth computer-executed step, the first application responding to receipt of the coordinate information from the second application by displaying on a display a map showing the location associated with the address that corresponds to the retrieved coordinate information.

2. A method as claimed in claim 1 wherein the contact information comprises a complete address.

3. A method as claimed in claim 1 wherein the contact information is provided to the second application from the first application to enable the contact information to be stored in the record of the database of the second application.

4. A method as claimed in claim 1 wherein the first application is within the same apparatus as the second application.

5. A method as claimed in claim 1 wherein the first application is in a different apparatus to the second application.

6. A method as claimed in claim 1, further comprising:
   a computer-executed step of displaying an icon to indicate that the contact information has been validated.

7. An apparatus comprising at least one processor and at least one memory including computer program code, the at least one memory and the computer program code configured to, with the at least one processor, cause the apparatus at least to:
   automatically provide contact information to a first application that comprises a map application in response to a user entering the contact information by entering text into a user input of the apparatus, the inputted text being descriptive of an address to be stored in a record of a database of a second application, the second application comprising at least one of an address book application and a calendar application;
   validate the input contact information by obtaining coordinate information from the first application where the coordinate information uniquely identifies the address as a location in a coordinate space;
   provide the obtained coordinate information from the first application to the second application and store, using the second application, the coordinate information in the database of the second application so that the coordinate information is associated with the address in the record, wherein the automatically providing the contact information, validating the input contact information, providing the obtained coordinate information and storing the coordinate information are performed without further user input after entering the contact information;
   where the second application responds to user selection of a control element associated with the record to retrieve the stored coordinate information from the record and provide the retrieved coordinate information to the first application; and
   the first application responds to receipt of the coordinate information from the second application by displaying on a display a map showing the location associated with the address that corresponds to the retrieved coordinate information.

8. An apparatus as claimed in claim 7, where in the at least one processor is further configured to display an icon to indicate that the contact information has been validated.

9. A non-transitory computer readable medium storing a program of machine-readable instructions executable by a digital data processing apparatus of a computer system to perform operations for controlling computer system actions, the instructions comprising:

code for automatically providing contact information to a first application that comprises a map application, where the automatically providing is executed by the digital data processing apparatus in response to a user entering the contact information by inputting text into a user input of a device, the inputted text being descriptive of an address to be stored in a record of a database of a second application, the second application comprising at least one of an address book application and a calendar application;

code for validating the input contact information by obtaining coordinate information from the first application, where the coordinate information uniquely identifies the address as a location in a coordinate space;

code for providing the obtained coordinate information from the first application to the second application and code for storing, using the second application, the coordinate information in the database of the second application so that the coordinate information is associated with the address in the record, wherein the automatically providing the contact information, validating the input contact information, providing the obtained coordinate information and storing the coordinate information are performed without further user input after entering the contact information;

code for causing the second application to respond to user selection of a control element associated with the record to retrieve the stored coordinate information from the record and provide the retrieved coordinate information to the first application; and code for causing the first application to respond to receipt of the coordinate information from the second application by displaying on a display a map showing the location associated with the address that corresponds to the retrieved coordinate information.

10. A non-transitory computer readable medium as claimed in claim 9, further comprising:

code configured to display an icon to indicate that the contact information has been validated.

* * * * *